June 24, 1958 F. H. GREEN 2,839,898
MULTIPLE VORTEX TUBE GENERATOR COOLING UNIT
Filed June 29, 1950 3 Sheets-Sheet 1

FREDERICK H. GREEN,
INVENTOR.

BY

ATTORNEY

June 24, 1958 F. H. GREEN 2,839,898
MULTIPLE VORTEX TUBE GENERATOR COOLING UNIT
Filed June 29, 1950 3 Sheets-Sheet 2

FREDERICK H. GREEN
INVENTOR.

BY
ATTORNEY

June 24, 1958     F. H. GREEN     2,839,898
MULTIPLE VORTEX TUBE GENERATOR COOLING UNIT
Filed June 29, 1950     3 Sheets-Sheet 3

FREDERICK H. GREEN
INVENTOR.

BY
ATTORNEY

United States Patent Office 2,839,898
Patented June 24, 1958

2,839,898

MULTIPLE VORTEX TUBE GENERATOR COOLING UNIT

Frederick H. Green, Los Angeles, Calif., assignor to The Garrett Corporation, Los Angeles, Calif., a corporation of California Application June 29, 1950, Serial No. 171,147

21 Claims. (Cl. 62—2)

My invention relates to cooling devices in general, and relates in particular to a cooling system and device for gaseous fluid, which is of light weight, and has no continuously rotating or reciprocating parts.

Although my invention is of utility in various arts, it is of particular utility on aircraft. For the purpose of illustrating my invention I have disclosed a form designed especially for use on aircraft. My invention, however, is not to be limited to such use. The embodiment of my invention disclosed herein is especially suited for supplying cooled air under pressure to electrical equipment employed in aircraft which is operated over a range of altitude from sea level to 50,000 feet. The life of direct current generators when operated at high altitudes is reduced if they are not pressurized and cooled. As illustrative of the benefits resulting from my invention, the structure disclosed herein, without the use of continuously rotating or reciprocating parts, when used for cooling instrumentalities such as generators up to an altitude of 50,000 feet, will maintain a pressure equivalent of an altitude of approximately 30,000 feet in the generator at all altitudes between 30,000 and 50,000 feet, thereby avoiding destructive arcing of the generator brushes and overheating of the generator structure.

It is an object of the invention to provide a cooling system wherein a cooling device is arranged to receive compressed relatively hot air from a source of air under pressure in the aircraft, such for example as a jet engine compressor employed in the aircraft, this air being cooled by cooling means including a bank of vortex tubes which are ordinarily in continuous operation, and there being means for progressively or sequentially bringing additional vortex tubes into operation in the cooling device as the pressure of the air decreases as the result of the rise of the aircraft to higher altitudes.

It is an object of the invention to provide a system having a cooling device for a gaseous fluid, which device has vortex cooler tubes and means responding to a change in a condition of the gaseous fluid related to change in of Fluids at Different Temperatures) arranged so that at sea level, when gaseous fluid of greatest density is available, the minimum number of vortex tubes will be employed, but as the aircraft rises in altitude so that there is a resulting decrease in the density and pressure of the compressed gaseous fluid, the responsive means will cause more vortex tubes to be brought into operation in accordance with a schedule which is characteristic of the control means.

A further object of the invention is to provide a cooling device of the character described herein which is relatively compact, has a simple and efficient control means embodied therein, and has vortex tubes (such, for example, as disclosed in Ranque Patent No. 1,952,281, granted March 27, 1934, for Method and Apparatus for Obtaining From a Fluid Under Pressure Two Currents of Fluids at Different Temperatures) arranged so that they are externally cooled by coolant air and avoid use of hot air outlets, the result being that all of the air fed into the vortex tubes under pressure is cooled by the vortex action of the tubes and by heat transfer from their surfaces. A feature of the invention is that it may be of such form that it can be attached directly to an end of a generator, or other device to be cooled, if desired.

It is an object of my invention to provide a method and system for supplying a cooled gaseous fluid for cooling purposes, in which the gaseous fluid is passed through vortex cooling means in a manner related to or controlled by the density of the gaseous fluid.

A further object of the invention is to provide a novel cooling means having a vortex tube closed at the end thereof opposite from the cooled air outlet of the tube, and means for cooling the tube.

Further objects and advantages of the invention will be brought out in the following part of the specification wherein I have described a preferred embodiment of the invention in detail for the purpose of making an extensive disclosure of the invention without limiting the scope of the invention set forth in the appended claims.

Referring to the drawings which are for illustrative purposes only:

Figure 1:
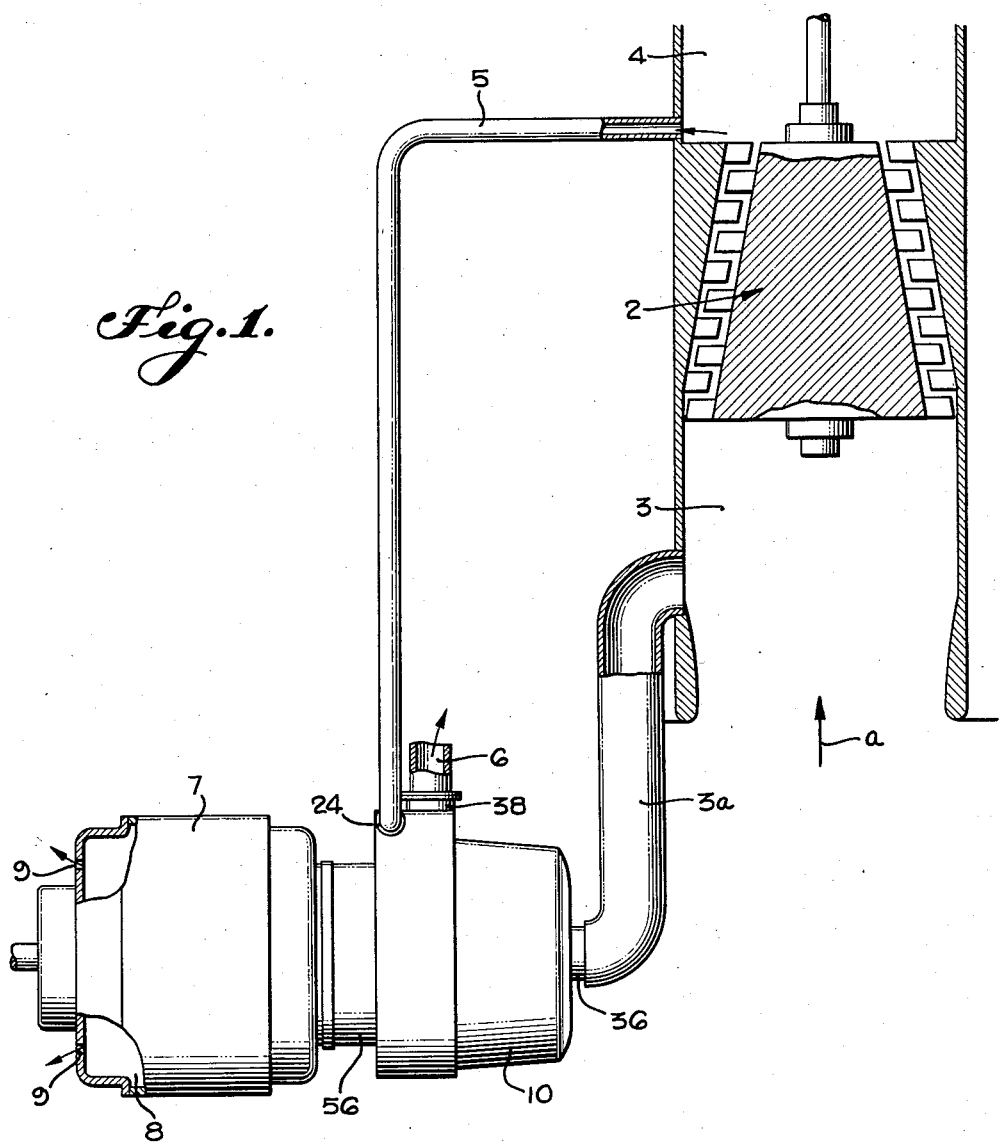
Fig. 1 is a schematic view of a system forming part of my invention.

In order to illustrate the simple system forming a part of the invention I have in Fig. 1 schematically shown a jet engine compressor 2 of an aircraft which receives ambient air through a ram air duct 3 as indicated by an arrow $a$ and delivers this air at required pressure through a compressed air outlet 4 to the jet engines of the aircraft. A bleed duct 5 carries a portion of the compressed air from the outlet 4 of the jet engine compressor 2 to the inlet 24 of a simple and effective cooler 10 wherein the air is first cooled and then delivered to one end of an instrumentality 7 which may be an electrical generator, which is to be cooled and pressurized. The cooled air is delivered under pressure to the interior space 8 of the instrumentality 7 and is allowed to escape through one or more small orifices 9 of such configuration as to act essentially as flow limiters when sonic velocity of the air through the orifice is reached. For example, when the aircraft is near sea level, ambient pressure may be 29.9 in. of mercury, with a pressure of about 31 in. of mercury in the space 8 of the generator 7. Control of the flow of air from the cooler 10 by regulating means therein which will be hereinafter described, may produce in the space 8 of the generator a pressure 8.9 in. of mercury when the aircraft has risen to an altitude having a pressure of 3.4 in. of mercury. Coolant air for the cooler 10 is taken from the ram duct 3 and is delivered through a duct 3a to the coolant air inlet 36 of the cooler 10. The coolant air leaves the cooler 10 through a coolant outlet 38 and, if desired, may be carried off through a duct 6.

Figure 2:
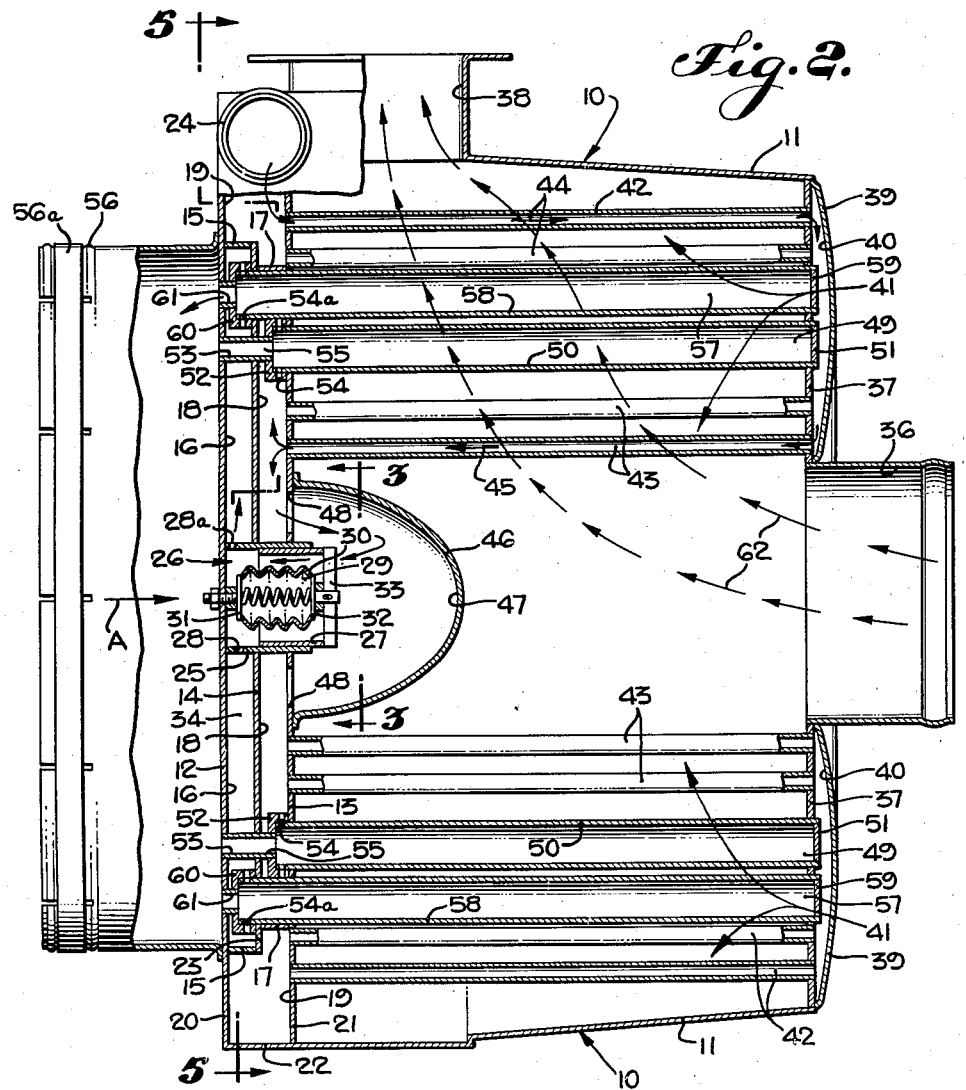
Fig. 2 is a longitudinal sectional view of a simple form of a cooling device forming a part of the system.
Figure 3:
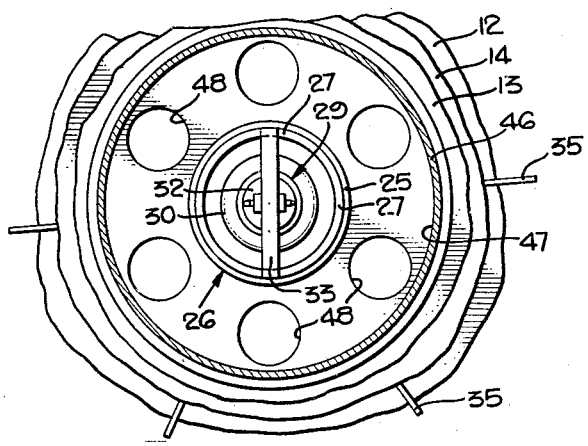
Fig. 3 is a fragmentary elevational view taken from the position indicated by the line 3—3 of Fig. 2.
Figure 5:
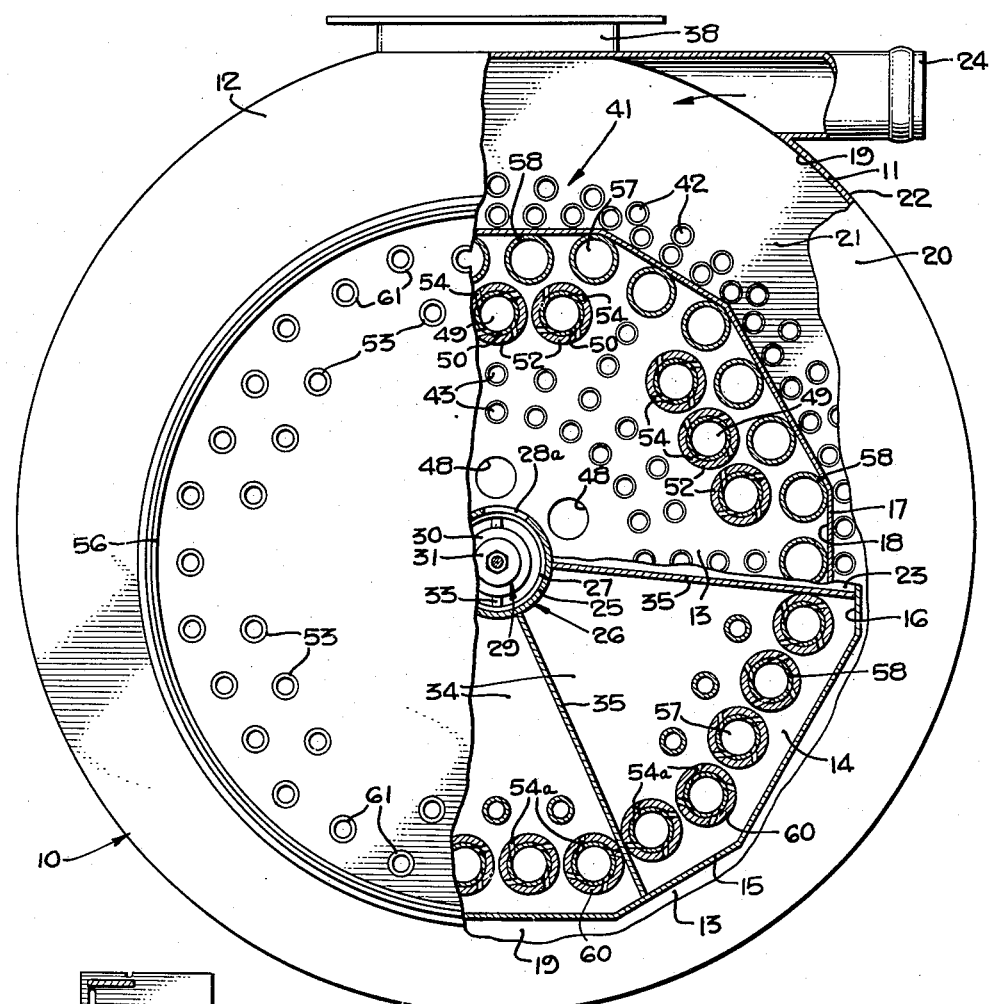
Fig. 5 is an end view of the device shown in Fig. 2 taken from the position of the letter A, the view being sectioned as indicated by the line 5—5 of Fig. 2.

As shown in Figs. 2 and 5, the cooler 10 has a shell or wall 11 of generally cylindric form but being slightly tapered from the front toward the rear end thereof. A front wall 12 is mounted at the leftward end of the wall 11. Spaced inwardly from the wall 12 there is a plate 13, the diameter of which is substantially the same as the diameter of the wall 11 at the plane of the plate 13.

Between the wall 12 and the plate 13 there is an intermediate wall 14, the periphery of which is connected to the wall 12 by a strip wall 15. The wall 14, the strip wall 15 and the portion of the wall 12 lying within the limits of the strip wall 15, define a chamber 16. A strip wall 17 extends from the wall 14 to the plate 13 and cooperates with the plate 13 and the wall 14 in forming a flat chamber or air duct 18 adjacent a portion of the front face of the wall 13.

A plenum or air inlet chamber 19 of annular form is defined by the peripheral portions 20 and 21 of the wall 12 and the plate 13, the portion 22 of the wall 11 therebetween, the strip walls 15 and 17 and an annular portion 23 of the intermediate wall 14. The inlet chamber 19 is supplied with compressed air from a source of air under pressure, such as the bleed 5 from the high pressure outlet of a jet engine compressor in an aircraft, through an inlet fitting 24 which may be arranged tangentially, as shown.

A cylindric wall 25 is disposed axially of the shell 10 and is carried by the central portions of the walls 12 and 14 and the plate 13. This cylindric wall 25 forms part of a valve mechanism 26 having a cylindric closure member 27 which is slidable within the cylindrical wall 25, and is moved relatively to ports 28 through the wall 25 by pressure responsive control means 29. The pressure responsive means is shown as having a spring-expanded aneroid bellows 30 and with end wall 31 thereof connected to the wall 12 and the other end wall 32 thereof connected to a cross-bar 33 which is fixed on the rightward end of the closure member 27.

Figure 4:
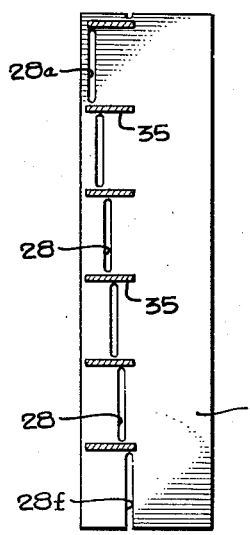
Fig. 4 is a flat pattern of the outer wall of the control valve shown in Figs. 2 and 3.

The chamber 16 is divided into a plurality of manifolds 34 by radial walls 35. In the form of the invention disclosed herein there are six of the radial walls 35 dividing the chamber 16 into six manifolds 34 to which compressed air is fed selectively through the ports 28 under control of the closure member 27 which is moved by the pressure responsive control means 29. From Fig. 4, it will be perceived that the ports 28 are relatively narrow, circumferentially extended slots in the cylindric wall 25 of the valve mechanism 26. Furthermore, these valve ports 28 are arranged progressively in offset relation so that the port indicated at 28a will be nearest the leftward or outer end of the valve cylinder 25 and the port 28 specifically indicated as 28f will be farthest away from the leftward end of the cylindric wall 25, the purpose of this arrangement being that as the closure 27 is moved rightward from the extreme leftward position thereof the valve ports 28 will be progressively opened from the port 28a to the port 28f and compressed air will be fed into the manifolds 34 in a selected order. The pressure responsive means 29 is shown in the condition thereof existing when the aneroid bellows 30 is exposed to low pressure such as encountered at high altitudes. As sea level pressure is approached the bellows 30 will be gradually collapsed and the valve closure 27 will be moved leftwardly from the position in which it is shown in Fig. 1 into a position wherein, at or near sea level, all of the valve ports 28 will be closed.

The coolant air inlet 36 is supported in the center of a rear end plate 37 disposed at the rightward end of the wall 11. The coolant air outlet 38 is supported by the wall 11 near the leftward end of the shell 10. An annular plate 39 is secured to the rightward end of the shell 10 in a position surrounding the coolant air inlet 36 so as to provide externally of the plate 37 an air chamber or passage 40 which cooperates in the formation of a heat exchanger or preliminary cooler 41 within the shell 10. This heat exchanger 41 comprises a first bank of tubes 42 arranged annularly so as to connect the inlet chamber 19 with the peripheral portion of the chamber 40. A second bank of tubes 43 is arranged to connect the inner portion of the chamber 40 with the chamber 18. The ends of the tubes 42 and 43 are supported by the plates 13 and 37, as shown in Fig. 2. Hot compressed air, entering the chamber 19 through the inlet 24 follows a path through the tubes 42, the chamber 40 and the tubes 43 into the chamber 18, as indicated by arrows 44 and 45. A dome or cap 46, secured to the face of the plate 13 provides a chamber 47 communicating with the inlet of the valve 26, and openings 48 are provided in the plate 13 connecting the chamber 18 with the chamber 47.

Continuously operating vortex tubes 49 are supported between the banks of tubes 42 and 43 by the plates 13 and 37. Each of these continuously operating vortex tubes 49 includes a hot tube portion 50 having a disc 51 closing its rear end and having a cap 52 on its front end, each cap 52 supporting a cooled air outlet tube 53 coaxially of the hot tube portion 50. The caps 52 of the vortex tubes 49 are arranged in the peripheral portions of the chamber 18, and tangential openings 54 pass through the circumferential walls of the cap 52 and the adjacent portions of the tube parts 50, to provide inlet nozzles or ports communicating with the ends of the hot tube portions 50 adjacent the cooled air outlets 55 provided by the tubes 53. These tubes 53 extend leftwardly from the caps 52 through the walls 14 and 12 respectively and deliver cooled air into a cooled air outlet fitting 56 of cylindric form which is secured to the leftward face of the wall 12. The outlet fitting 56 is provided with a clamping band 56a for securing it to the end of a generator or other cylinder part.

Intermittently operating vortex tubes 57 are supported by the plates 13 and 37 outwardly of the vortex tubes 49 and extend through wall 14. These vortex tubes 57 have hot tube portions 58 with discs 59 closing their rear ends. The hot tube portions 58 extend through the plate 13 and the wall 14 into the manifolds 34, and on the ends of the hot tube portions 58 projecting into the manifolds 34 caps 60 are fitted, which caps 60 support cooled air outlet tubes 61 which connect through openings in the end wall 12 with the interior of the cooled air outlet fitting 56. The caps 60, similar to the caps 52, have tangential openings 54a which communicate through the adjacent walls of the hot tube portions 58. In the operation of the cooling device near sea level, the pressure responsive means 29 will hold the valve closure 27 in a position closing all of the ports 28, and air will pass through the tubes 42 and 43, in heat exchange relation to coolant air which travels from the inlet 36 to the outlet 38 as indicated by arrows 62 in Fig. 2. This partly cooled air is delivered from the tubes 43 into the chamber 18, from which there will be a continual flow of air through the nozzles 54 into the vortex tubes 49. The coolant air from the duct 3a, moving as indicated by the arrows 62, will likewise cool the hot tube portions 50 of the vortex tubes 49, and from the outlet tubes 53 of the vortex tubes 49 there will be an issue of cold air which will be delivered by the outlet fitting 56 to the selected receiving means.

Although I have shown cooling substantially all of the hot tube portions 50, it is within the invention to cool only selected parts of the hot tube portions.

It is characteristic of the jet engine compressor in normal operation that as ambient air pressure decreases, there is a decrease in pressure in the outlet of the jet engine compressor and, therefore, in the pressure existing in the chamber 47, and expansion of the aneroid bellows 30 will move the valve closure 27 rightward so that there will be first an opening of the valve port 28a permitting a flow of air from the chamber 18 through openings 48 and chamber 47 into one of the manifolds 34 whereupon the vortex tubes 57 having their inlet nozzles 54a communicating with this manifold 34 will be fed with air. The hot tube portions 58 of the vortex tubes 57 are likewise cooled by coolant air which moves as indicated by arrows 62, and the compressed air which is fed into this first group of vortex tubes 57 will be issued through the therewith associated outlet tubes 61 into the cooled air outlet fitting 56.

As the aircraft continues to rise there will be a further rightward movement of the valve closure 27 to progressively or sequentially open additional valve ports 28 so that there will be feeding of compressed air to additional groups of vortex tubes 57. As the airplane rises air pressure in the nozzles of the vortex tubes decreases, and, therefore, flow through the operating vortex tubes decreases and reduces the cooling capacity of the air cooling device. Therefore, as the airplane rises, more vortex tubes are brought into operation to compensate for the reduction of air flow through individual tubes. When the valve closure 27 is moved to its extreme rightward position, all of the ports 28 will be opened and all of the vortex tubes 49 and 57 will be in operation to supply cooled air to the space or equipment in the aircraft which requires cooling.

As the aircraft or other aerial vehicle employing the invention descends from the higher altitudes, the control means 29 will close the valve ports 28 in an order reverse to that explained in the foregoing, so that there will be a reduction in the number of vortex tubes in service as the density of the air increases, until finally when the lower altitudes are reached only the continuously operating vortex tubes 49 will be in service.

I claim:

1. In an aircraft having a jet engine compressor and a ram air duct, a system for cooling and pressurizing an instrumentality: a delivery duct to take high pressure air from the outlet of said compressor; vortex tube means connected to said delivery duct; means arranged to conduct coolant air from said ram duct across outer surfaces of said vortex tube means; regulating means adapted to control the flow of high pressure air through said vortex tube means, said regulating means having parts acting as the pressure of air in said delivery duct decreases to increase the quantity of said tube means through which high pressure air is flowing; means for conducting cooled high pressure air from said tube means to a space of said instrumentality; and means forming an outlet orifice means for said space, said orifice means being characterized by limitation of flow from said space when sonic velocity of air through said orifice is reached.

2. In an aircraft having a jet engine compressor and a ram air duct, a system for cooling and pressurizing an instrumentality: a delivery duct to take high pressure air from the outlet of said compressor; vortex tube means connected to said delivery duct; means arranged to conduct coolant air from said ram duct across outer surfaces of said vortex tube means; regulating means adapted to control the flow of high pressure air through said vortex tube means, said regulating means comprising valve means for determining the flow of said high pressure air through said vortex tube means, and parts acting as the pressure of air in said delivery duct decreases to increase the opening of said valve means; means for conducting cooled high pressure air from said tube means to a space of said instrumentality; and means for controlling the outlet of air from said space.

3. In an aircraft having a jet engine compressor and a ram air duct, a system for cooling and pressurizing an instrumentality: a delivery duct to take high pressure air from the outlet of said compressor; vortex tube means connected to said delivery duct; means arranged to conduct coolant air from said ram duct across outer surfaces of said vortex tube means; regulating means adapted to control the flow of high pressure air through said vortex tube means, said regulating means comprising valve means adapted to effect a continuous flow of said high pressure air through said vortex tube means, and parts acting as the pressure of air in said delivery duct decreases to increase the opening of said valve means; means for conducting cooled high pressure air from said tube means to a space of said instrumentality; and means for controlling the outlet of air from said space.

4. In an aircraft having a jet engine compressor and a ram air duct, a system for cooling and pressurizing an instrumentality: a delivery duct to take high pressure air from the outlet of said compressor; vortex tube means connected to said delivery duct; means arranged to conduct coolant air from said ram duct across outer surfaces of said vortex tube means; regulating means adapted to control the flow of high pressure air through said vortex tube means, said regulating means effecting a continuous flow of said high pressure air through a selected quantity of said tube means and having parts acting as the pressure of air in said delivery duct decreases to increase the quantity of said tube means through which high pressure air is flowing; means for conducting cooled high pressure air from said tube means to a space of said instrumentality; and means for controlling the outlet of air from said space.

5. In an aircraft having a source of high pressure air, a system for cooling and pressurizing an instrumentality: a delivery duct to take high pressure air from said source of high pressure air; vortex tube means connected to said delivery duct; regulating means adapted to control the flow of high pressure air through said vortex tube means, said regulating means effecting a continuous flow of said high pressure air through a selected quantity of said tube means and having parts acting as the pressure of air in said delivery duct decreases to increase the quantity of said tube means through which high pressure air is flowing; means for conducting cooled high pressure air from said tube means to a space of said instrumentality; and means for controlling the outlet of air from said space.

6. In an aircraft having a source of high pressure air, a system for cooling and pressurizing an instrumentality: a delivery duct to take high pressure air from said source of high pressure air; vortex tube means connected to said delivery duct; regulating means adapted to control the flow of high pressure air through said vortex tube means, said regulating means comprising valve means for determining the flow of said high pressure air through said vortex tube means, and parts acting as the pressure of air in said delivery duct decreases to increase the opening of said valve means; means for conducting cooled high pressure air from said tube means to a space of said instrumentality; and means for controlling the outlet of air from said space.

7. In a device for cooling a gaseous fluid which moves from a zone of higher pressure to a zone of lower pressure: walls forming a path of flow for the fluid from the zone of relatively higher pressure; cooler means comprising cooler tubes; means for directing fluid from said path of flow continuously through a selected quantity of said cooler tubes; means responding to a change in a quality affecting the density of said fluid so as to deliver fluid from said path of flow through other of said tubes and vary the quantity of said tubes in use as the density of said fluid varies; and fluid delivery means arranged to receive the fluid from said tubes and conduct the same to said zone of lower pressure.

8. In a device for cooling a gaseous fluid which moves from a zone of higher pressure to a zone of lower pressure: walls forming a path of flow for the fluid from the zone of relatively higher pressure; cooler means comprising cooler tubes; means for directing fluid from said path of flow through a selected quantity of said cooler tubes; valve means connecting said path of flow through other of said tubes; control means having a part which moves in response to change in pressure of said fluid; a linkage from said part to said valve means acting to open said valve means as said part moves in response to said decrease in pressure of said fluid; and fluid delivery means arranged to receive the fluid from said tubes and conduct the same to said zone of lower pressure.

9. In a device for cooling a gaseous fluid which moves from a zone of higher pressure to a zone of lower pressure: walls forming a path of flow for the fluid from the zone of relatively higher pressure; cooler means comprising cooler tubes; means for directing fluid from said path of flow into a selected quantity of said cooler tubes; control means responsive to a change in a quality affecting the density of said fluid; valve means connecting said path of flow through other of said tubes; an operating connection between said control means and said valve means adapted to sequentially open said valve means as said density of said fluid decreases; and fluid delivery means arranged to receive the fluid from said tubes and conduct the same to said zone of lower pressure.

10. In a device for cooling a gaseous fluid which moves from a zone of higher pressure to a zone of lower pressure: walls forming a path of flow for the fluid from the zone of relatively higher pressure; cooler means comprising vortex cooler tubes; means for directing fluid from said path of flow continuously into a selected quantity of said cooler tubes; means responding to a change in a quality affecting the density of said fluid so as to deliver fluid from said path of flow through other of said tubes and vary the quantity of said tubes inversely as the density of said fluid changes; and fluid delivery means arranged to receive the fluid from said tubes and conduct the same to said zone of lower pressure.

11. In a device for cooling a gaseous fluid which moves from a zone of higher pressure to a zone of lower pressure: walls forming a path of flow for the fluid from the zone of relatively higher pressure; heat exchange means for passing said fluid in said path of flow in heat exchange relation to other fluid so as to cool said fluid; cooler means downstream from said heat exchange means comprising vortex cooler tubes; means for directing fluid from said path of flow into a selected number of said cooler tubes; means responding to a change in a quality affecting the density of said fluid so as to deliver fluid from said path of flow into other of said tubes and vary the number of said tubes in use; and fluid delivery means arranged to receive the fluid from said tubes and conduct the same to said zone of lower pressure.

12. In a device for cooling a gaseous fluid which moves from a zone of higher pressure to a zone of lower pressure: walls forming a path of flow for the fluid from the zone of relatively higher pressure; cooler means comprising vortex cooler tubes; means for directing fluid from said path of flow into a selected number of said vortex cooler tubes; means responding to a change in a quality affecting the density of said fluid through said cooler tubes, so as to deliver fluid from said path of flow into other of said tubes and vary the quantity of said tubes in use inversely of said density; fluid delivery means arranged to receive the fluid from said tubes and conduct the same to said zone of lower pressure; and means arranged to apply a cooling fluid to the outer surfaces of said tubes.

13. In a device for cooling a gaseous fluid which moves from a source of said fluid to an object to be cooled: a plurality of groups of vortex tubes; means for connecting the inlets of one group of said vortex tubes continuously to said source; walls forming separate manifolds connected to the inlets of the remaining groups of said vortex tubes, control means comprising valve means operating to sequentially connect said source to said manifolds; and fluid delivery means connected to the outlets of said vortex tubes.

14. In a device for cooling a gaseous fluid which moves from a source of said fluid to an object to be cooled: a plurality of groups of vortex tubes; means for connecting the inlets of one group of said vortex tubes continuously to said source; walls forming separate manifolds connected to the inlets of the remaining groups of said vortex tubes; control means comprising valve means operating to sequentially connect said source to said manifolds; means for directing a coolant fluid in contact with the outer surfaces of said tubes; and fluid delivery means connected to the outlets of said vortex tubes.

15. In a device for cooling a gaseous fluid which moves from a source of said fluid to an object to be cooled: a plurality of heat exchanger tubes having their inlets connected to said source; a plurality of groups of vortex tubes; means for connecting the inlets of one group of said vortex tubes continuously to outlets of said heat exchanger tubes; walls forming separate manifolds connected to the inlets of the remaining groups of said vortex tubes; control means comprising valve means operating to sequentially connect outlets of said heat exchanger tubes to said manifolds; means for directing a coolant fluid in contact with the outer surfaces of said tubes; and fluid delivery means connected to the outlets of said vortex tubes.

16. In a device for cooling a gaseous fluid which moves from a source of said fluid to an object to be cooled; a plurality of groups of vortex tubes; means for connecting the inlets of one group of said vortex tubes continuously to said source; walls forming separate manifolds connected to the inlets of the remaining groups of said vortex tubes; control means comprising valve means operating to sequentially connect said source to said manifolds and means responsive to decrease in pressure of said gaseous fluid to so actuate said valve means; and fluid delivery means connected to the outlets of said vortex tubes.

17. In a device for cooling a gaseous fluid which moves from a source of said fluid to an object to be cooled: a plurality of heat exchanger tubes having their inlets connected to said source; a plurality of groups of vortex tubes; means for connecting the inlets of one group of said vortex tubes continuously to outlets of said heat exchanger tubes; walls forming separate manifolds connected to the inlets of the remaining groups of said vortex tubes; control means comprising valve means operating to sequentially connect outlets of said heat exchanger tubes to said manifolds and means responsive to decrease in pressure of said gaseous fluid to so actuate said valve means; means for directing a coolant fluid in contact with the outer surfaces of said vortex tubes; and fluid delivery means connected to the outlets of said vortex tubes.

18. In a device for cooling a gaseous fluid which moves from a source of said fluid to an object to be cooled: a valve device having a plurality of circumferentially spaced outlet ports and means for progressively opening said ports; walls forming radially extending manifolds having their inner ends connected to said ports; vortex tubes disposed so that their inlets are connected respectively to said manifolds; heat exchanger tubes having their inlets connected to said source and their outlets connected to the inlet of said valve device; means for directing a coolant fluid across the external surfaces of said vortex tubes; and means acting in response to decrease in the pressure of said gaseous fluid to operate said valve device so as to open said outlet ports.

19. A method of cooling, by use of cooler tube means a gaseous fluid which flows from a zone of higher pressure to a zone of lower pressure, comprising: conducting said fluid through said path of flow including therein cooler tube means; and varying the magnitude of said cooler tube means included in said path in accordance with change in density of said gaseous fluid.

20. A method of cooling, by use of vortex cooler tube means a gaseous fluid which flows from a zone of higher pressure to a zone of lower pressure, comprising: conducting said fluid through said path of flow including therein vortex cooler tube means; and varying the magnitude of said vortex cooler tube means included in said path in accordance with change in density of said gaseous fluid.

21. A method of cooling, by use of vortex cooler tube means a gaseous fluid which flows from a zone of higher pressure to a zone of lower pressure, comprising: conducting said fluid through said path of flow including therein vortex cooler tube means; and connecting additional vortex cooler tube means in parallel to said path of flow as the density of said gaseous fluid decreases.

References Cited in the file of this patent

UNITED STATES PATENTS

| | | |
|---|---|---|
| 1,952,281 | Ranque | Mar. 27, 1934 |
| 2,412,110 | Williams | Dec. 3, 1946 |
| 2,522,787 | Hughes | Sept. 19, 1950 |

FOREIGN PATENTS

| | | |
|---|---|---|
| 605,691 | Germany | Nov. 16, 1934 |

UNITED STATES PATENT OFFICE
CERTIFICATE OF CORRECTION

Patent No. 2,839,898

June 24, 1958

Frederick H. Green

It is hereby certified that error appears in the printed specification of the above numbered patent requiring correction and that the said Letters Patent should read as corrected below.

Column 1, line 55, for "of Fluids at Different Temperatures)" read -- density of this fluid, such means being --; column 2, line 54, for "seal level" read -- sea level --.

Signed and sealed this 9th day of September 1958.

(SEAL)
Attest:

KARL H. AXLINE
Attesting Officer

ROBERT C. WATSON
Commissioner of Patents